Figure 1:
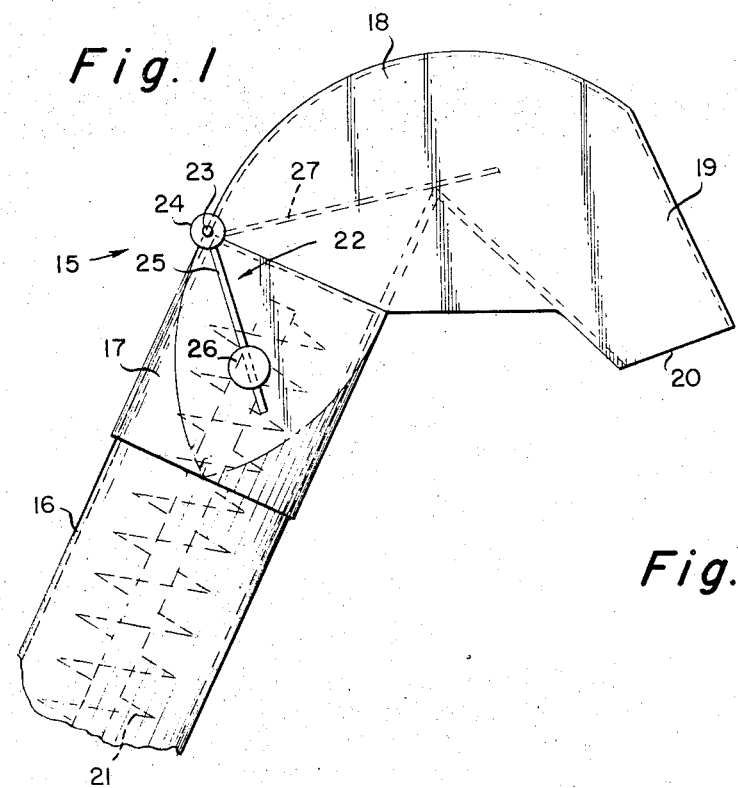

United States Patent [19]
Diehl

[11] 3,774,446
[45] Nov. 27, 1973

[54] SYSTEM FOR MEASUREMENT OF VOLUME OF FLOW OF A FLOWABLE GRANULAR-LIKE MATERIAL

[75] Inventor: John A. Diehl, Arlington, Va.

[73] Assignee: Richard H. Hayes, Talmadge, Ohio; a part interest

[22] Filed: Oct. 19, 1972

[21] Appl. No.: 299,078

[52] U.S. Cl. ............................... 73/194 R, 73/228
[51] Int. Cl. .............................................. G01f 1/00
[58] Field of Search ................. 73/228, 194 R, 198; 222/55, 59; 33/121

[56] References Cited
UNITED STATES PATENTS
2,033,306   3/1936   Schofield .............................. 73/228
2,552,569   5/1951   McNamara .......................... 73/194
3,351,236   11/1967  Sorenson et al. ................. 222/55 X FOREIGN PATENTS OR APPLICATIONS
1,184,977   1/1965   Germany

*Primary Examiner*—Richard C. Queisser
*Assistant Examiner*—John P. Beauchamp
*Attorney*—William A. Smith, Jr. et al.

[57] ABSTRACT

A system for measurement of volume of flow of a flowable granular-like material such as grain in a partially confining flow path, which system includes a vane positioned to be deflected by the material at a point in the flow path where it becomes virtually free of said confinement, the position of said vane establishing an analogue electrical signal which is converted to digital for read out.

9 Claims, 5 Drawing Figures

SYSTEM FOR MEASUREMENT OF VOLUME OF FLOW OF A FLOWABLE GRANULAR-LIKE MATERIAL

BACKGROUND

Prior Art

The use of deflectable vanes (or equivalent) for the purpose of determining volume of flow of a conveyed substance is well known, as evidenced by Keeler U.S. Pat. No. 2,312,216 and Hillyar-Russ et al. U.S. Pat. No. 3,295,213, and such a deflectable vane has been coupled to an analogue to digital convertor (German Pat. No. 1,184,977). In each of the foregoing disclosures, the deflectable element is positioned over a movable conveying element (i.e., an endless belt) whereby the depth of the material on the belt (and hence the degree of deflection) varies with factors other than the true volume or density of the material, notably (1) the conditions of original loading of the belt, such as impact of free drop, force of head of material in the case of hopper feed, and (2) conditions during transit such as compaction by restricting elements (doctor blade, structural elements, etc.), settling due to vibration during conveyance, etc. Furthermore, the use of deflectable elements over such conveyors is limited to a substantially horizontal flow at least to the extent that the material will not roll back or slide under the deflectable element as a result of factors which unpredictably affect the depth of the material, such as differing characteristics of adhesiveness, weight, particle shape, coarseness or fineness, etc.

Deflectable vanes have also been disclosed as creating electrical analogue signals proportionate to the depth of material flowing in an inclined gravity type conveyor, or chute, the analogue signals being converted to digital for readout purposes. Such a disclosure may be found in Sorenson et al. U.S. Pat. No. 3,351,236, in which the inventor recognizes that the rate of flow along the chute 27 is a function of a number of variables, such as the angle of the chute, the initial velocity of the material entering the chute, the shape of the bottom of the chute, the form of flow restricting elements, etc. While Sorenson mentions that a simple farm type of weighing device apparatus will require only one transducer because of the uniform nature of materials to be measured, namely grains, his disclosure is limited to an apparatus wherein, even with only one transducer, response is not only to the rate and amount of material flowing in the chute 27, but additionally to the variable inclination of the flow chute, which inclination is defined as the "actual" or "geometrical angle" of the chute. Hence, the apparatus of Sorenson operates with a dependance on a measurable inclination relative to a standard, presumably the horizontal, and is thus limited to a static system wherein the standard is invariable.

PURPOSES OF INVENTION

In contradistinction to the aforementioned systems, the present invention provides a simple system for measurement of flow of a flowable granular-like material which is equally well adapted to use in a static or mobile environment. In the latter instance, the system finds particular application in the environment of a mobile threshing machine which provides anything but a stable base, often operating on side hill terrain involving extremely variant inclinations of the threshing apparatus which provides the only available reference base. While numerous additional purposes and advantages may be evident from a consideration of the ensuing specification, the following are enumerated as representative of the principal objects of this invention, which are to provide 1. an accurate measurement device of low power requirements,
2. a measurement device requiring a minimum of moving parts,
3. a measurement device of simple and economical make up,
4. a measurement device tolerant of variations in the inclination of the flow conduit of the material undergoing flow measurement,
5. a method implementing the above objectives.

SUMMARY OF INVENTION

In keeping with the foregoing objects, this invention involves a deflectable vane which is critically positioned at a point in the flow path of the flowable granular-like material whereat the material undergoes a transition from the forced flow to a gravity flow. At this particular point, the material has been found to be relatively free of disturbing influences inherent in the nature of the conveying element, inclination thereof, and variations in adherance, particle size, rate or impact of initial feed, etc. This point lies between the termination of a positive or force feed conveying element and a point of free flow discharge from the conveying conduit and is hereinafter referred to as a threshold point in the flow path. In the preferred embodiment, the deflectable vane is positioned at a threshold point where the depth of material crests in its transition from forced feed to free flow and at which it retains to a significant extent a depth determined by the volumetric characteristics of the flow, while at the same time is released of extraneous influences of the conveying element or back pressure of material downstream of the measuring element as determined by characteristics such as length and inclination of the downstream conduit.

Moreover, and also in furtherance of the foregoing objects, this invention provides an electronic analogue to digital converter whereby the deflection of the vane is integrated with time and a digital readout is provided by solid state circuitry. The system involves a minimum of moving parts and power consuming elements. To this end, a counter, which may be either an all solid state counter or a solenoid driven impulse counter, is driven by a circuit controlled by a pulse generator including a unijunction transistor and an RC charging circuit. An analogue value in the form of a steady state voltage the amplitude of which is derived from the position of the deflectable vane is applied to the RC circuit in a manner that the capacitor charges at a rate dependent upon that value. When the charge reaches a predetermined threshold value, the unijunction transistor conducts to discharge the condensor, thus generating a pulse to advance the counter and resetting the RC circuit to enable it to repeat the cycle. The recurrence frequency of pulse generation, and thus the counting rate, is dependent upon the RC charging rate and thus is an indication of the degree of deflection of the vane.

IDENTIFICATION OF DRAWINGS

Figure 2:
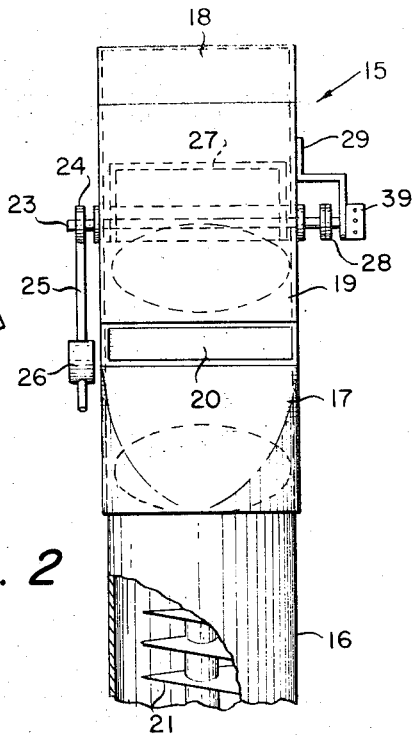
Figure 3:
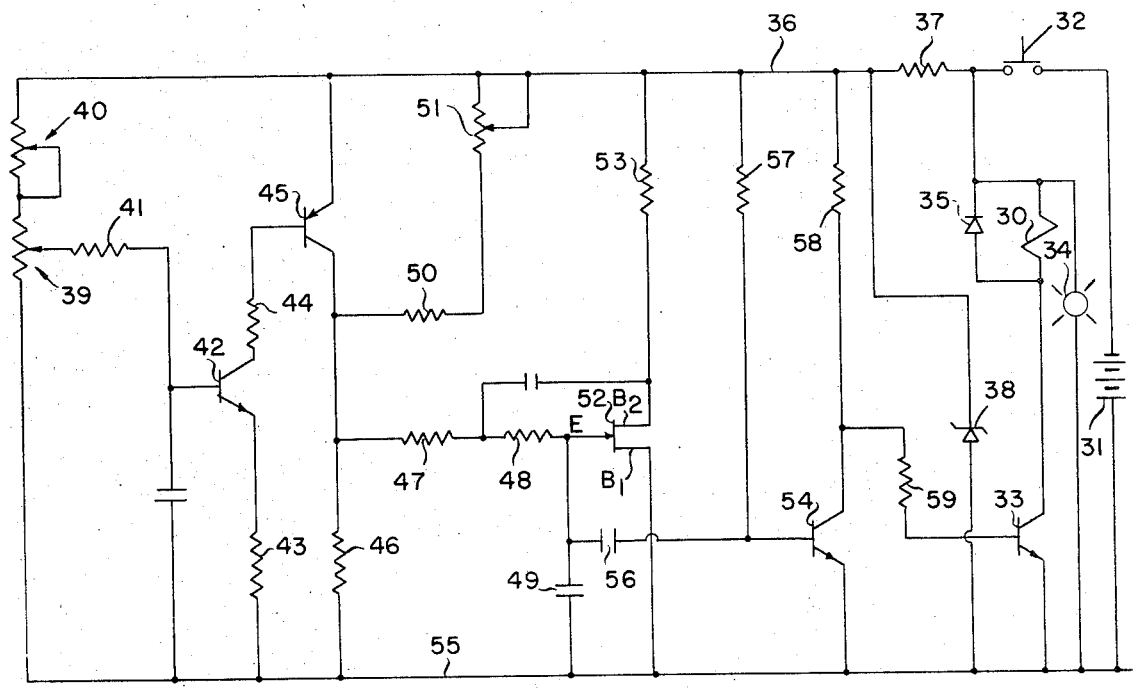
Figure 4:
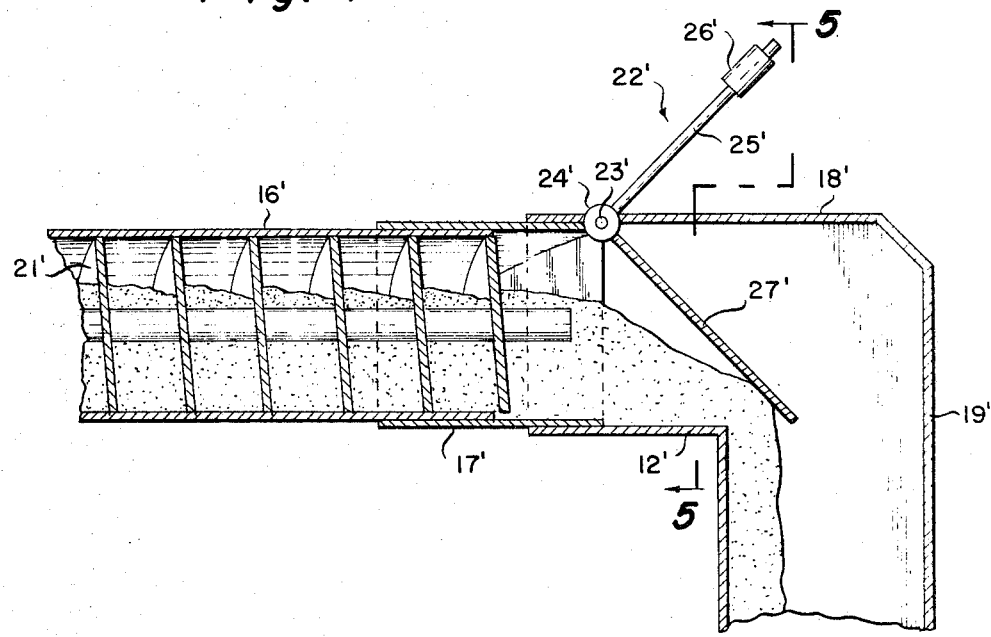
Figure 5:
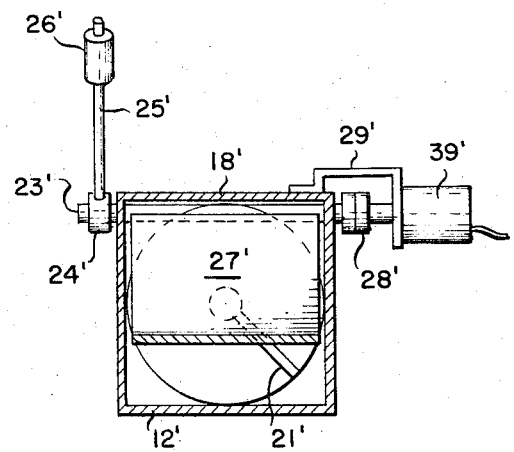

For a better understanding of the invention, reference is made to the following description taken in connection with the accompanying drawings, in which FIG. 1 is an elevational side view of the terminal end of a conveyor including the sensor of this invention, FIG. 2 is an elevational end view of the same, FIG. 3 is a schematic diagram of the electronic circuit of this invention, FIG. 4 is a longitudinal section of the terminal end of a conveyor including the sensor of this invention, and FIG. 5 is a cross section taken at V—V of FIG. 4.

DESCRIPTION OF SENSOR

Referring to the drawings, and particularly to FIGS. 1 and 2, the terminal portion of a conveying element including the sensing device of this invention is generally indicated at 15. In the particular embodiment used for illustrative purposes, the conveyor comprises a cylindrical tube 16 and screw 21, and is capped by a transition section 17 which supports a discharge hood 18 of rectangular cross section and including a depending discharge chute 19 leading to a free discharge end 20. The particular angle of the discharge chute is not critical except to the extent that it offers virtually no resistance to gravity flow of materials through it. In FIGS. 1 and 2 gravity flow commences at the junction of the bottom surfaces 14 and 13, referred to as a threshold 12.

A deflectable vane assembly generally indicated at 22 comprises a shaft 23 extending through the hood 18 at a point near the upper surface thereof and rotatably supported by appropriate bearings. A collar 24 adjustably attached to said shaft carries a torque rod 25 extending in a direction normal to the shaft 23. A weight 26 is adjustably attached at a selected point near the outer extremity of the torque rod 25. Rigidly attached to the shaft 23 inside of the hood 18 is a vane 27 also extending in a direction normal to shaft 23 and including a portion which overlies the threshold 12. While this portion could be the edge of the vane 27, it is preferred that the vane extend beyond the threshold 12 so that a side surface thereof rests against the material being measured. One end of shaft 23 is connected to an element of an angularly adjustable shaft coupling 28, the other element of which is coupled to potentiometer 39, the housing of which is rigidly supported as by bracket 29. This arrangement permits adjustment of the vane position relative to the potentiometer arm to adapt to a particular installation.

Another embodiment, illustrated in FIGS. 4 and 5, is similar to that of FIGS. 1 and 2 and hence is shown with the same reference numerals and a prime suffix. In the interest of brevity, the description of FIGS. 1 and 2 is applicable here and will not be repeated. Note, however, that the embodiment of FIGS. 4 and 5 comprise a horizontally disposed force feed conveyor 16' and a vertical discharge chute 19'. Again, the disposition and length of the chute 19' is not critical to any extent other than that it presents no restriction to free gravity flow of the material beyond the threshold 12'. It is commonplace on a grain combine to extend this chute by a flexible boot (not shown) into the receiving receptacle to avoid the loss of grain by its being picked up by wind.

OPERATION OF SENSOR

As can be seen from an examination of FIG. 4, the depth of the material within the force feed portion 16' of the material varies considerably because of the action of the conveying elements, whether they be the convoluted flights of the screw 21' as in this example or the flights of other known types of positive conveyors. Another factor influencing this depth involves back pressure of the material itself which in turn is a function of the condition of the material, speed of conveyance, and angle of inclination of the conveyor. The last factor is of particular importance in the case of mobile installations, but also must be considered in stationary installations where the inclination is often varied in order to hold the discharge end proximate to the top of the previously delivered material.

On the other hand, it is difficult to measure the flow during free gravity flow, most such attempts having forced resort to sophisticated weighing systems which have proven to be excessively temperamental in many environments.

I have found that the aforesaid difficulties can be avoided by critically locating the sensor in a position where the vane 27' overlies the threshold 12' where the transition from forced feed to free flow take place. At this point the material is still partially confined in the lateral dimensions of the path of flow, but is free of the confinement of back pressure. To this end, the pivot point of the vane 27', namely the shaft 23' is situated upstream of the threshold 12' and the vane 27' is dimensioned and positioned so as to include a material contacting portion overlying the threshold. Thus, contact is made with the material at a point free of influences of back pressure and where the deflection of the vane is representative of the volume of flow and substantially independent of the factors such as inclination of the apparatus.

DESCRIPTION AND OPERATION OF ELECTRONIC CIRCUITRY

Referring to FIG. 3, there is disclosed the circuitry for integrating an analogue value derived from the vane position and producing a digital signal to operate a conventional impulse counter (not shown). The impulse counter, which may be of the type disclosed in U.S. Pat. No. 1,480,738 issued Jan. 15, 1924 to C. H. Veeder, is driven by a solenoid 30, the operating potential for which is derived from a direct current power supply here represented by battery 31, in series with OFF/ON switch 32 and transistor 33. A pilot light 34 serves as an indicator that power is applied to the system. Transistor 33 is biased to normally nonconducting condition, and is pulsed to drive solenoid 30 by a control circuit now to be described. Surges generated by the solenoid coil back EMF at the end of each pulse are bypassed by diode 35 in conventional fashion to avoid damage to transistor 33.

The control circuit also derives its voltage from power supply 31, but requires a regulated voltage supply. To this end, lead 36 is provided with a voltage dropping resistor 37, and a zener diode 38 maintains the potential at lead 36 at a prescribed voltage which, in the preferred embodiment, is 10 volts.

In order to calibrate the analogue voltage produced at the movable tap of vane potentiometer 39, a rate adjust rheostat 40 is provided to further drop the regulated voltage derived from lead 36. The rate adjust potentiometer permits counter response to be adjusted to derive a particular volumetric measure (e.g., 1 count equal 0.1 bushel of grain) as determined by the physical parameters of the particular installation.

The position of the movable arm of potentiometer 39 is determined by the position of the vane 27, increased deflection of the vane by increased grain flow volume serving to move the arm upwardly and increase the positive voltage potential thereat. This potential appears, through resistor 41 at the base of transistor 42, which is connected in common-emitter circuit configuration to function as an amplifier. An increase in potential at the base of transistor 42 thus serves to increase conduction therethrough and hence through resistors 43, 44 and the emitter base circuit of transistor 45. The potential at the base of transistor 45 thus raises to increase flow therethrough. Transistor 45 is incorporated in a common-collector circuit including output resistor 46 which provides an impedance match to RC timing circuit comprising resistors 47, 48 and condensor 49 and, with resistor 50 and potentiometer 51 comprises a voltage divider to establish an adjustable bias to control the firing level of the pulse generator, now to be described.

Unijunction transistor 52 has its emitter/base 1 circuit connected in shunt with capacitor 49, operating voltage being established from its base 2 through current limiting resistor 53. The voltage at the base of UJT 52 is established by adjustment of potentiometer 51 to a point where, during conditions of non-conduction of transistor 45, the emitter diode of UJT 52 is reverse-biased, thus no current flows from emitter to base 1. The function of integrating the value of the voltage appearing at the movable arm of potentiometer 39 is here accomplished by the generation of pulses at a rate directly proportional to the amplitude of that voltage, thus converting the signal from analogue to digital. To this end the amplified signal appears at the output of the common collector circuit including transistor 45 and is applied through resistors 47 and 48 to charge capacitor 49, the value of these components establishing a charging rate dependent upon the said output voltage. As the voltage at the emitter of UJT 52 (i.e., at the RC junction) increases to a point where the emitter diode thereof is no longer reverse-biased, the UJT conducts, exhibiting the negative resistance characteristic inherent in this element, and discharges capacitor 49 through its emitter/base 1 junction to ground lead 55. The sudden discharge of capacitor 49 passes a negative pulse through capacitor 56 to the base of transistor 54. At the same time, the discharge of capacitor 49 brings the emitter of UJT 52 back to a reverse-biased condition, terminating conduction therein, and initiating another charging cycle in RC circuit 47, 48, 49. Inasmuch as the charging rate is dependent on the voltage at the collector of transistor 45, the pulsing cycle is repeated at a pulse rate dependent upon the analogue voltage determined by the setting of vane potentiometer 39. The UJT is chosen for this function because of its inherent stable triggering threshold and high pulse current carrying (negative resistance) capacity.

Prior to reception of the pulse through capacitor 56 transistor 54 is biased to a normally conducting state by its base resistor 57. As a pulse is received, transistor 54 cuts off, and current flow through its collector resistor 58 is diverted through resistor 59 to the base of transistor 33, to bring that transistor to saturation and advance pulse counter drive solenoid 30.

The operation of the counter is conventional, and provides a numerical readout indicative of the flow rate expressed in volume per time unit. By appropriate adjustment of vane potentiometer a calibration can be reached to provide a read out expressed as cumulative weight.

SUMMARY

As is evident from a consideration of the foregoing discussion, this invention provides a simple, but critically positioned deflectable vane sensor which avoids the necessity of correlating the single variable quantity (material depth) with other variable and unpredictable factors, and combines with this sensor a simple, all electronic analogue to digital electronic measuring circuit. The foregoing combination is particularly adapted to the demanding conditions encountered in grain handling where contamination by dust results in malfunction of moving parts which are here held to a minimum.

While preferred embodiments have been shown and described, the invention is not limited to these embodiments, the scope thereof being properly determined by the following claims.

I claim:

1. A system for measurement of volume of flow of a flowable granular-like material moving in a flow path including a positive drive portion, a gravity flow portion, and a threshold between said portions, said system including a deflectable vane mounted for pivotal movement about an axis situated over said path at a point upstream of said threshold, said vane having a free end portion extending into said flow path in a generally downstream direction and including a portion for contacting said material at a point overlying said threshold.

2. The system of claim 1 wherein said free end portion terminates downstream of said threshold.

3. The system of claim 1 further including electrical analogue signal generating means operatively coupled to said deflectable vane, and an electronic analogue to digital converting means having an input electrically coupled to said analogue signal generating means and an output at which is presented as a digital signal comprising a series of pulses the repetition rate of which is a derivitive of said analogue signal.

4. The system of claim 3 further including a counter and means to apply said output pulses to said counter to obtain a numerical read out.

5. The system of claim 4 wherein said counter is incrementally driven by a solenoid driver, said driver being pulsed by said output pulses to incrementally advance said counter.

6. The system of claim 3 wherein said analogue to digital convertor comprises a unijunction transistor including an emitter diode junction, said input being coupled to an RC circuit the capacitor of which is in shunt with said emitter diode junction.

7. The system of claim 3 wherein said derivative is a ratio of said analogue signal amplitude to time and said analogue signal generating means includes means to adjust said amplitude and thus to vary said ratio whereby said system can be calibrated in terms of a known weight per volume of material.

8. The system of claim 3 wherein said operative coupling comprises an angularily adjustable shaft coupling.

9. A method of measuring the flow volume of a flowable granular-like material comprising the steps of a. providing a predetermined flow path including, in sequence, a positive drive portion, a threshold, and a gravity flow section, b. applying a driving force to the material to impart movement thereto through said positive drive portion and across said threshold, c. permitting free flow of said material through said gravity flow section whereby said material crests in depth above said threshold, d. sensing the depth of said material at said crest, and e. integrating said sensed depth with time to provide a measurement of flow rate.

* * * * *